(12) United States Patent
Boudreault

(10) Patent No.: US 6,976,296 B2
(45) Date of Patent: Dec. 20, 2005

(54) CONSTANT VELOCITY (CV) BOOT INSTALLER FOR MOTOR VEHICLES

(75) Inventor: Joselitho Boudreault, Flushing, NY (US)

(73) Assignee: Astoria 2000 LLC, Woodside, NY (US)

( * ) Notice: Subject to any disclaimer, the term of this patent is extended or adjusted under 35 U.S.C. 154(b) by 0 days.

(21) Appl. No.: 10/607,387

(22) Filed: Jun. 26, 2003

(65) Prior Publication Data

US 2004/0261238 A1    Dec. 30, 2004

(51) Int. Cl.⁷ .............................................. B23P 19/02
(52) U.S. Cl. ........................................ 29/235; 29/252
(58) Field of Search ...................... 29/235, 252, 422, 29/448, 450, 789, 797; 464/175

(56) References Cited

U.S. PATENT DOCUMENTS

| | | | |
|---|---|---|---|
| 4,416,275 A | * | 11/1983 | Omley .................. 29/235 |
| 4,512,072 A | * | 4/1985 | Graham ................ 29/235 |
| 6,139,027 A | | 10/2000 | Biekx |
| 6,254,487 B1 | | 7/2001 | Jacob |

OTHER PUBLICATIONS

*Boot Slider*, article cited at the following internet address: http://www.bootslider-fr.com/boot_slider.html by Ligum Ltd.

* cited by examiner

*Primary Examiner*—Robert C. Watson
(74) *Attorney, Agent, or Firm*—Collard & Roe, P.C.

(57) ABSTRACT

A CV boot installation and removing device comprising a base having a connection opening for coupling to a CV boot. With this design, there is a handle coupled to the base and a power connection disposed either inside or adjacent to the handle. There is an adjuster, which can be in the form of a substantially cylindrical shaft, for adjusting an opening size of the connection opening for receiving the CV boot. There is also a biasing device coupled to the base, for biasing the connection opening closed against the CV boot wherein the biasing device can be pressed open by said adjuster to form a connection to the CV boot to a point at which said connection opening opens to fit over a CV boot as controlled by the adjuster.

19 Claims, 3 Drawing Sheets

CONSTANT VELOCITY (CV) BOOT INSTALLER FOR MOTOR VEHICLES

BACKGROUND

The invention relates to a CV boot installer which can be used to install or uninstall CV boots on an automobile or other similar type motor vehicles. CV boots are known in the art for example, U.S. Pat. No. 6,139,027 to Bickx issued on Oct. 31, 2000 and U.S. Pat. No. 6,254,487 to Jacob issued on Jul. 3, 2001 both relate to CV boots and are both incorporated herein by reference. In particular, CV boots are protective boots for CV joints wherein these boots generally have a tubular shape with end openings and a bulbous or bellows like mid portion having crests and troughs. These boots must be replaced from time to time because of damage due to particular incidents and wear or they must be removed so that a mechanic can repair a CV joint in a car.

SUMMARY

The invention relates to a CV boot installation and removing device comprising a base having a connection opening for coupling to a CV boot. With this design, there is a handle coupled to the base and a power connection disposed either inside or adjacent to the handle. There is an adjuster, or piston, which can be in the form of a substantially cylindrical shaft, for adjusting an opening size of the connection opening for receiving the CV boot. There is also a biasing device coupled to the base, for biasing the connection opening closed against the CV boot wherein the biasing device can be pressed open by the adjuster to form a connection to the CV boot to a point at which the connection opening opens to fit over a CV boot as controlled by the adjuster.

Other additional optional features of the invention may involve a trigger coupled to said handle wherein said trigger is for controlling a particular amount of power into said adjuster via said power connection. The open coupling end of the device can include a plurality of legs or arms coupled to the base wherein the biasing device biases the arms closed against the CV boot. The biasing device can be in the form of a plurality of springs wherein each leg is biased closed via at least one of the plurality of springs. The adjuster can comprise a shaft that is axially displacable along the longitudinal axis of the base, and within the base wherein the shaft can be pressed against the arms to open the arms to receive a CV boot. This adjuster further comprises an indexed knob that is coupled to a back end of the base. With this design, the base contains an inscription of an index for setting an open diameter for said connection opening.

The handle has a longitudinal axis that extends substantially perpendicular to a longitudinal axis of the base.

Another optional feature of the invention is that the power connection is in the form of an attachment for compressed air. For example, when the power connection is connected to an output for compressed air, the compressed air will flow through said handle and through the base to bias the adjuster to open the arms at the end of the base. The base can also include a separate head plate coupled to the base, wherein the arms are coupled to the head plate.

BRIEF DESCRIPTION OF THE DRAWINGS

Other objects and features of the present invention will become apparent from the following detailed description considered in connection with the accompanying drawings which disclose at least one embodiment of the present invention. It should be understood, however, that the drawings are designed for the purpose of illustration only and not as a definition of the limits of the invention.

In the drawings, wherein similar reference characters denote similar elements throughout the several views.

DETAILED DESCRIPTION

Figure 1:
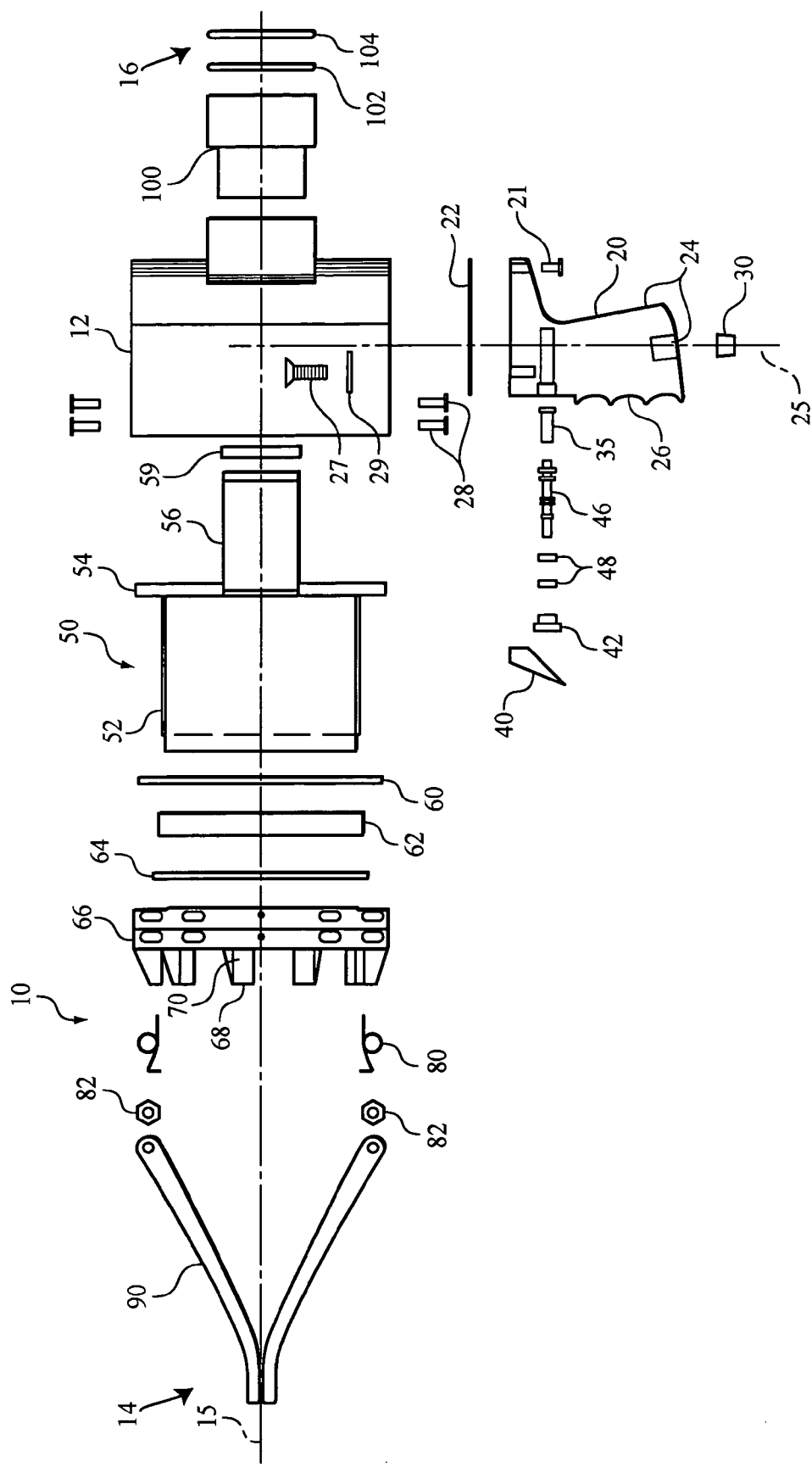
FIG. 1 is an exploded side cross-sectional view of the device.

Referring in detail to the drawings, FIG. 1 discloses an exploded, side cross-sectional view of the device 10. With this view, there is a base 12 which can be formed as a substantially hollow cylinder having a first open section 14 extending along a longitudinal axis 15, and an open back end section 16 along that same longitudinal axis 15.

Base 12 can be coupled to a handle 20 via screws 21, 27 and 28 wherein a connection plate 22 is disposed between handle 20 and base 12. First section 14, of base 12, has a larger diameter than second section 16. Handle 20 extends along a longitudinal axis 25 that is substantially perpendicular to the base longitudinal axis 15. Handle 20 has a plurality of ergonomic indents or finger placements 26 which allow a user to place his or her fingers on handle 20.

Handle 20 has a power connection 30 wherein power connection 30 can be in the form of a pneumatic connection that allows compressed air to enter into an interior region of handle 20. Handle 20 has an interior air passage 24 which allows air to flow therein. This interior air passage extends up to body or base 10 but can be blocked by a stopper, block, or valve 46 which is coupled to a trigger 40. Trigger 40 is coupled to handle 20 wherein trigger 40 includes a trigger plate 41, a trigger button 42, a trigger head 44, a trigger back spring 35 and a plurality of washers 48 disposed in between head 44 and trigger shaft 46. Trigger shaft 46 is coupled to stopper 46 wherein, stopper 46 is biased in a closed position closing off the air flow within handle 20. However, when trigger 40 is pressed, stopper 46 is opened allowing compressed air to flow through handle 20 and into base 12 to power the device.

There is also an adjuster or piston 50 disposed substantially within base 12. Adjuster 50 is formed as a substantially hollow cylinder which is axially slidable within base 12. Adjuster 50 has a first section 52 that has a cross-sectional diameter sized to fit a CV boot. There is also an intermediate section 54 formed as a flange plate. A third section 56 of adjuster 50 is also formed substantially cylindrical such that it slides within back end opening 16 on base 12. Adjuster 50 is axially slidable within base 12 to control the size of an opening for device 10.

An intermediate flange plate 60, is used to couple a head plate 66 to base 12 and around or outside of adjuster 50. There is also a steel ring 62 which couples to adjuster 50 to protect adjuster 50 from wear. Steel ring 62 interacts with arms 90 such that when steel ring 90 contacts arms 90 they open. Thus, steel ring 90 provides a protection barrier on adjuster 50. In addition, plate 64 is actually a guide that allows steel ring 90 to slide there-through. Head plate 66 has a substantially circular cross section and includes a plurality of flanges, or flanged supports 68 extending out along longitudinal axis 15 of head plate 66. Head plate 66 includes a plurality of connection elements 81 for allowing springs 80 and connecting rings 82 for connecting springs 82 to arms 90. Arms 90 are connected radially around head plate 66. Arms 90 include a connection element 92 (FIG. 5) for securing each arm 90 to a particular location on head plate 66 and another notch 94 (FIG. 5 for securing each arm to adjuster 50.

Springs 80 bias arms 90 closed such that arms 90 form a closed end. An index adjustment dial 100 is coupled to the back end of base 12 such that index adjustment dial 100 can be rotated within base 12 to control how far adjuster 50 slides axially within base 12. The distance of the axial movement of adjuster 50 is controlled by index adjustment dial 100 such that the greater the distance traveled by adjuster 50, the larger the opening formed with arms 90.

Figure 4:
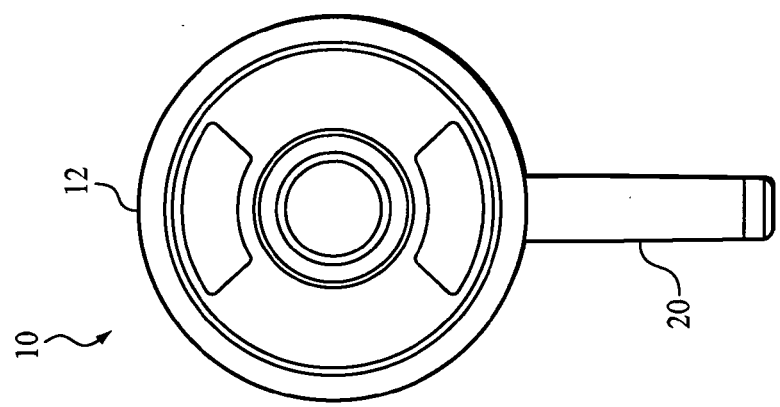
FIG. 4 is a back end view of the device shown in FIG. 1.
Figure 3:
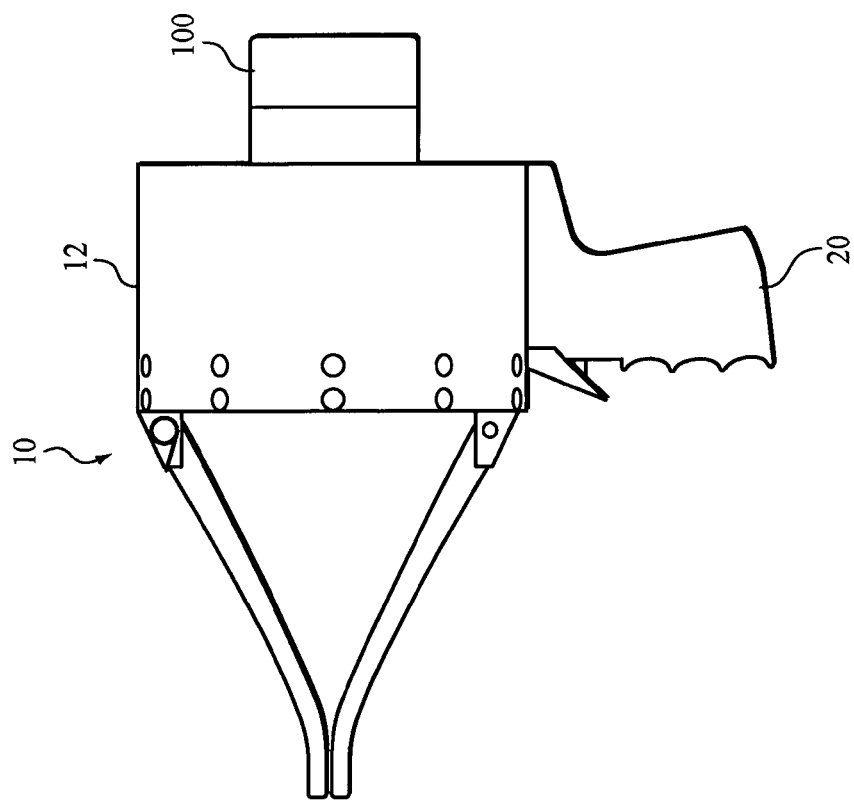
FIG. 3 is a side view of the device shown in FIG. 1.
Figure 2:
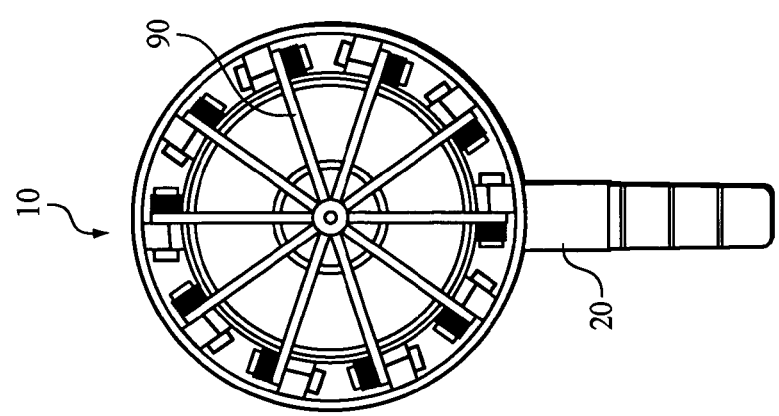
FIG. 2 is a front end view of the device shown in FIG. 1.

FIG. 2 shows a front view of device 10 which shows arms 90 in a closed position which positions these arms to radiate in from an outer circumferential section of base 12. FIG. 3 is a side view of the device shown in FIG. 2. With this view, arms 90 are shown coupled to base 12 via springs 80. FIG. 4 shows a back view of the device which shows the open, continuously extending opening from front to back through back end section 16 of base 12.

Figure 5:
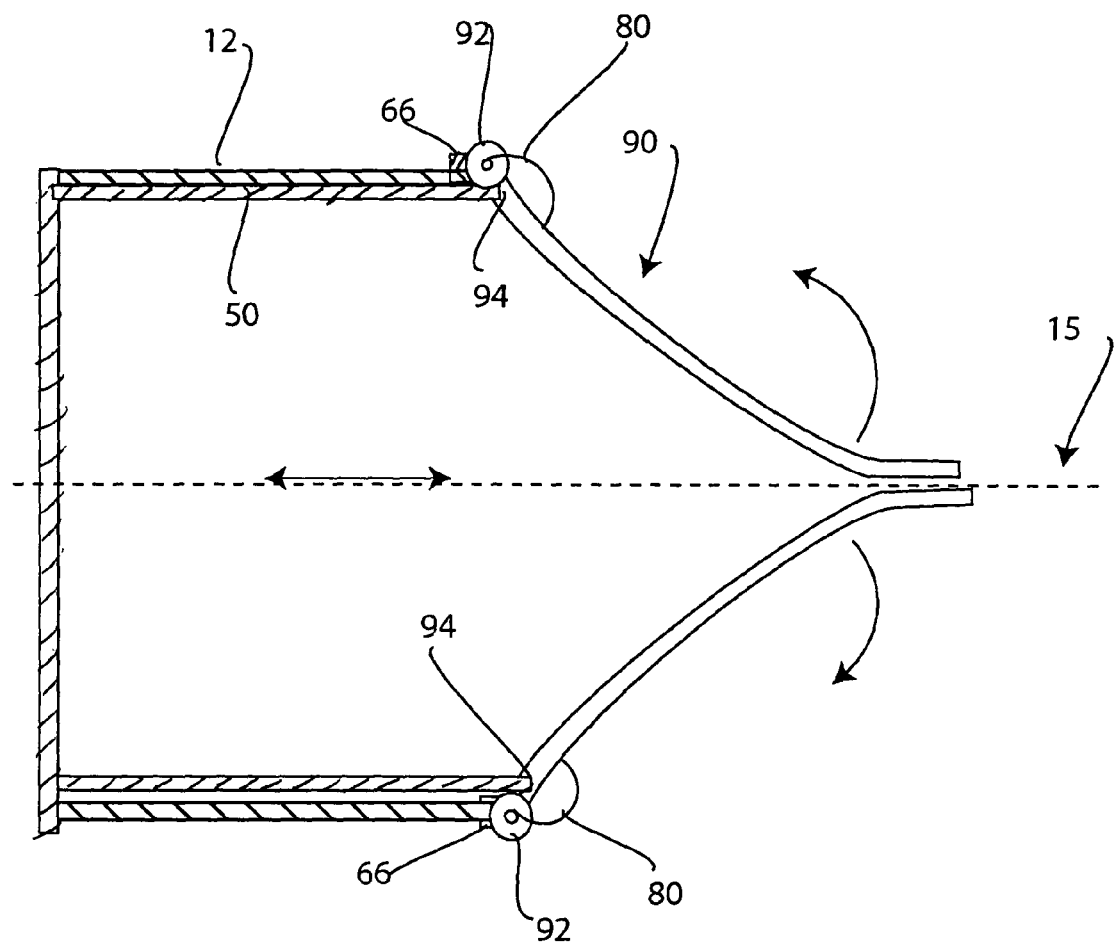
FIG. 5 is a side view of one of the arms shown in FIG. 1.

FIG. 5 shows the connection between arms 90, head plate 66 and adjuster 50. With this design, arms 90 include a coupling connection 92 and a notch 94 which connect arms 90 to head plate 66 and adjuster 50 respectively. Coupling connection 92 can be coupled to head plate 66 in an outer circumferential region of leg 90 while notch 94 can be coupled to adjuster 50 in an inner circumferential region. Leg 90 is fixed to head plate 66 via coupling connection 92 and is biased closed via spring 80. However, when adjuster 50 slides axially along longitudinal axis 15, it presses against arms 90 in notches 94 causing them to rotate about a pivot point formed by coupling connection 92 to press leg 90 against spring 80 and then subsequently rotate open.

In operation, a user who desires to remove a CV boot would first connect the power connection 30 within handle 20 to an air compressor. Once this connection is made, compressed air is forced into handle 20 and is stopped by stopper 46. The user then pulls trigger 40 opening the passage between handle 20 and base 12 so that air flows in base or body 12 to create an air pocket creating a pneumatic thrust, causing piston 50 to thrust axially forward toward arms 90 to create a pressurized air pocket. Piston 50 thus moves along longitudinal axis 15 of base 12. This movement causes adjuster 50 to contact an inner circumferential region of arms 90 with adjuster 50 pushing against inner notches 94, to cause arms 90 to rotate against springs 80 and to open. If the opening that is created is not large enough or is too small, to remove the CV boot, the user can easily adjust this opening by turning dial 100 to the appropriate setting for the opening. If the user wishes to deactivate the device, he can simply release the trigger, thus causing adjuster 50 to slide back into its original position wherein springs 80 force arms 90 closed. Upon release of the trigger, stopper valve 46 also contains a release valve in the un-pressed condition such that the compressed air in the body or base 12 is now released from the gap between flange 54 and body 12.

Accordingly, while at least one embodiment of the present invention has been shown and described, it is to be understood that many changes and modifications may be made thereunto without departing from the spirit and scope of the invention as defined in the appended claims.

What is claimed is:

1. A CV boot installation and removing device comprising:

a) a base having a connection opening for coupling to a CV boot;
   b) a handle coupled to said base;
   c) a power connection disposed adjacent to said handle;
   d) an adjuster slidably disposed within said base and coupled to said connection opening for adjusting an opening size of said connection opening for receiving the CV boot;
   e) a plurality of arms coupled to said base; and
   f) a biasing device coupled to said base, wherein said biasing device biases said arms closed against the CV boot to form said connection opening, wherein said biasing device is in the form of a plurality of springs wherein each arm of said plurality of arms is biased closed via at least one of said plurality of springs wherein said biasing device is for biasing said connection opening in a closed position against said CV boot wherein said biasing device can be acted on by said adjuster to a point at which said connection opening opens as controlled by said adjuster to form a connection with the CV boot.

2. The device as in claim 1, further comprising a trigger coupled to said handle wherein said trigger is for controlling a particular amount of power fed into said base to power said adjuster via said power connection.

3. The device as in claim 1, further comprising a plurality of arms coupled to said base wherein said biasing device biases said arms closed against the CV boot to form said connection opening.

4. The device as in claim 3, wherein said adjuster comprises a piston that is axially displaceable within said base wherein said piston can be pressed against said plurality of arms to open said plurality of arms to receive a CV boot.

5. The device as in claim 4, wherein said adjuster further comprises an indexed knob for adjusting a length of movement of said piston in said base wherein said base contains an inscription of an index for setting said length of movement of said piston and thus controlling a size of an open diameter for said connection opening.

6. The device as in claim 1, wherein said handle has a longitudinal axis that extends substantially perpendicular to a longitudinal axis of said base.

7. The device as in claim 6, wherein said base has a front end and a back end and wherein said connection opening extends along said longitudinal axis of said base.

8. The device as in claim 3, wherein said power connection is in the form of an attachment for compressed air.

9. The device as in claim 3, wherein said handle has an air passage and said power connection is in the form of an attachment for compressed air, such that when said power connection is connected to an output for compressed air, the compressed air will flow through said handle and through said base to force said adjuster to move axially in said base to open said plurality of arms.

10. The device as in claim 3, further comprising a head plate coupled to said base, wherein said plurality of arms are coupled to said head plate.

11. The device as in claim 3, wherein said plurality of arms comprises at least 10 arms.

12. The device as in claim 10, wherein said head plate has a plurality of supports for receiving said plurality of arms wherein each support of said plurality of supports receives at least one arm.

13. The device as in claim 4, wherein said piston is in the form of a shaft.

14. A CV boot installation and removing device comprising:

a) a base having an open front end and an open back end for connecting to a CV boot;
b) a plurality of arms rotatably coupled to said open front end of said base;
c) a plurality of springs coupled to said base and to said plurality of arms for biasing said plurality of arms in a closed position;
d) a handle coupled to said base and having an air shaft disposed therein leading to said base;
e) a power connection in the form of a pneumatic connection disposed adjacent to said handle wherein said pneumatic connection allows air to flow into said air shaft in said handle;
f) a valve disposed within said air shaft in said handle;
g) a trigger coupled to said handle for selectively activating said valve wherein said valve is biased in a closed position such that when said trigger is pressed, pneumatic air flows through said handle and into said base; and
h) an adjusting shaft slidably disposed within said base for sliding within said base when said trigger is pressed, such that pneumatic air flows through said handle, into said base and causes said adjusting shaft to slide in said base against said plurality of rotatable arms to cause said rotatable arms to rotate to open a connection opening for receiving the CV boot.

15. A CV boot installation and removing device comprising:
a) a body having an open front end and an open back end for connecting to a CV boot;
b) a plurality of arms rotatably coupled to said open front end of said body;
c) a plurality of springs coupled to said body and to said plurality of arms for biasing said plurality of arms in a closed position;
d) a power connection in a form of a pneumatic connection disposed adjacent to said handle; and
e) an adjusting shaft slidably disposed within said body for sliding within said body against said plurality of rotatable arms to cause said rotatable arms to rotate to open a connection opening for receiving the CV boot.

16. A CV boot installation and removing device comprising:
a) a base having a connection opening for coupling to a CV boot;
b) a handle coupled to said base;
c) a power connection disposed adjacent to said handle;
d) an adjuster slidably disposed within said base and coupled to said connection opening for adjusting an opening size of said connection opening for receiving the CV boot;
e) a biasing device coupled to said base, for biasing said connection opening in a closed position against said CV boot wherein said biasing device can be acted on by said adjuster to a point at which said connection opening opens as controlled by said adjuster to form a connection with a CV boot;
f) a piston that is axially displaceable within said base wherein said piston can be pressed against said plurality of arms to open said plurality of arms to receive a CV boot; and
g) an indexed knob for adjusting a length of movement of said piston in said base wherein said base contains an inscription of an index for setting said length of movement of said piston and thus controlling a size of an open diameter for said connection opening.

17. A CV boot installation and removing device comprising:
a) a base having a connection opening for coupling to a CV boot wherein said base has a front end and a back end and wherein said connection opening extends along said longitudinal axis of said base;
b) a handle coupled to said base wherein said handle has a longitudinal axis that extends substantially perpendicular to a longitudinal axis of said base;
c) an adjuster slidably disposed within said base and coupled to said connection opening for adjusting an opening size of said connection opening for receiving the CV boot; and
d) a biasing device coupled to said base, for biasing said connection opening in a closed position against said CV boot wherein said biasing device can be acted on by said adjuster to a point at which said connection opening opens as controlled by said adjuster to form a connection with a CV boot.

18. A CV boot installation and removing device comprising:
a) a base having a connection opening for coupling to a CV boot;
b) a handle coupled to said base;
c) a power connection disposed on an exterior surface of said handle for connection to an external power source;
d) an adjuster slidably disposed within said base and coupled to said connection opening for adjusting an opening size of said connection opening for receiving the CV boot; and
e) a biasing device coupled to said base, for biasing said connection opening in a closed position against said CV boot wherein said biasing device can be acted on by said adjuster to a point at which said connection opening opens as controlled by said adjuster to form a connection with a CV boot.

19. A CV boot installation and removing device comprising:
a) a base;
b) a CV boot receiving means for receiving a CV boot;
c) a handle coupled to said base;
d) a power connection disposed on an exterior surface of said handle for connection to an exterior power source;
e) an adjuster slidably disposed within said base and coupled to said connection opening for adjusting an opening size of said connection opening for receiving the CV boot; and
f) a biasing means coupled to said base, for biasing said connection opening in a closed position against said CV boot wherein said biasing means can be acted on by said adjuster to a point at which said connection opening opens as controlled by said adjuster to form a connection with a CV boot.

* * * * *